R. SAVON.
JOINT FOR METAL TUBES.
APPLICATION FILED MAR. 24, 1919.

1,329,479.

Patented Feb. 3, 1920.

Inventor
R. Savon.
By H. R. Kerslake
Atty

UNITED STATES PATENT OFFICE.

ROGER SAVON, OF PARIS, FRANCE.

JOINT FOR METAL TUBES.

1,329,479.  Specification of Letters Patent.  Patented Feb. 3, 1920.

Application filed March 24, 1919. Serial No. 284,866.

*To all whom it may concern:*

Be it known that I, ROGER SAVON, a citizen of the French Republic, residing at No. 17 Place de la Madeleine, Paris, France, have invented certain new and useful Improved Joints for Metal Tubes, of which the following is a specification.

For a large number of apparatus, and more particularly for aeroplanes, the employment of metal tubes for constructional purposes has great advantages as regards weight, rigidity, indeformability, and power of withstanding shock. However, the assemblage of the tubes together or with other parts, is a matter of rather great difficulty. At present such assemblage is effected either by brazing or welding which have the serious drawback of reheating the metal and thus causing it to lose a portion of its strength, or by soldering, which produces a joint that is much weaker than the tube itself.

The present invention has for its object to provide an improved joint for metal tubes that is unattended by these drawbacks. This improved apparatus comprises essentially an internal member for the tube, formed externally with grooves, upon which the tube is fixed with a driving fit by a suitable process (beading, circular rolling, constricting) in such a manner as to enter the said grooves, and an outer hoop formed with inner corrugations corresponding in shape to the shape of the grooves of the internal member. This hoop is forced on to the tube. This assemblage is capable of withstanding effectually the pulling forces in the direction of the length of the tube. Longitudinal recesses may be formed in the outer surface of the inner member, and the tube may be forced upon the said inner member in such a manner as to enter the said recesses when it is desired that the assemblage shall be capable also of withstanding twisting strains. In this manner very light tubular rotary shafts can be produced.

The preferred method of construction is described by way of example hereinafter and illustrated in the accompanying drawings, in its application to the assemblage of a tube upon a circularly flanged or swelled part.

Figure 1:
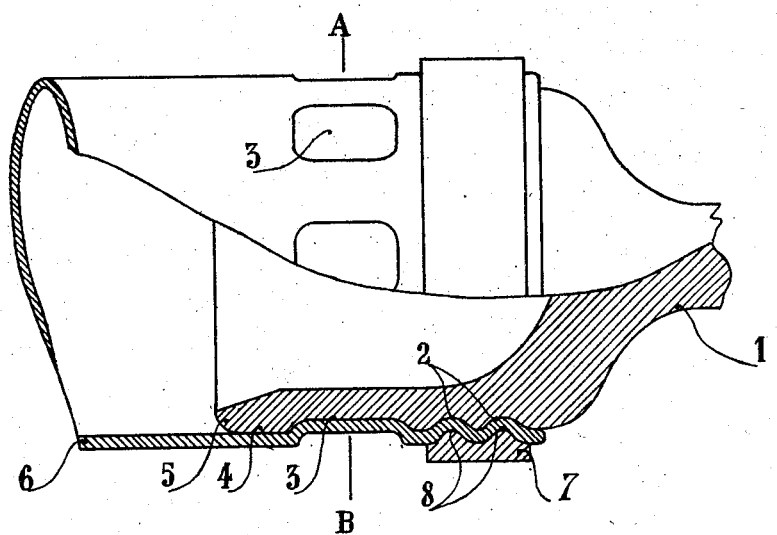
Figure 1 is an external view thereof with a portion broken away.
Figure 2:
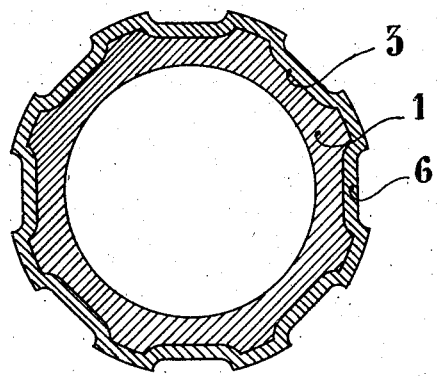
Fig. 2 is a cross section on a line A—B of Fig. 1.

The swelled part 1 is formed on the outer surface with a certain number of annular grooves 2, and also with a series of longitudinal recesses 3. It ends in a part 4 of cylindrical shape externally, having a rounded edge 5. The tube 6 is engaged upon the swelled part 1, and is forced into the grooves 2 and the recesses 3 in such a manner as to enter therein. A hoop 7 provided internally with corrugations 8 corresponding in shape to the shape of the grooves in the swelled part 1, is forcibly driven on to the tube 6 in such a manner as to be held in the grooves 2.

The fixing of the tube and of the hoop may be effected by any suitable known process (beading, circular rolling, constricting) hot or cold. The fixing of these two parts may be done separately or in one single operation. The forcing of the tube into the grooves 2 opposes pulling strains in the direction of the length of the tube. The fixing of the tube in the recesses 3 opposes twisting strains.

This fixing may be done by means of a hooping press. Instead of being annular, as shown, the grooves may be helical in form. In such a case the hoop 7 forms, so to speak, a nut, for which the swelled part 1 forms the screw, having between them the thickness of the tube 6. The forcing of the tube may then be effected directly by screwing up the hoop. The cylindrical end 4 ending in a rounded edge 5 is designed to do away with shearing strains on the tube that might occur with a swelled part having a straight edge when the diameter of the tube 6 should tend to become reduced owing to the action of the pulling strain.

This joint may serve either for assembling a tube upon a swelled part, as in the example shown, or for assembling two tubes placed end to end. In the latter case the inner member consists of a tubular member formed with external grooves at its two ends and engaging half in each of the two tubes' to be assembled together. The external member is a hoop provided with inner corrugations corresponding to the said grooves. The two tubes are fixed upon the inner member and then the hoop is fixed upon the two adjacent ends of the tubes. The hoop may be a split collar with a clamping screw thread, and it may carry or be formed with axle pins or sockets for receiving other tubes in such a manner as to constitute a junction piece for assembling tubes extending in different directions.

What I claim is:—

1. In a pipe joint, the combination of an inner member formed with transverse external grooves, a tube forced upon said inner member and an outer hoop formed with inner corrugations corresponding in shape to the shape of the grooves in the said inner member, forced upon the tube.

2. In a pipe joint, the combination of an inner member formed with transverse external grooves, and external longitudinal recesses, a tube forced into said grooves and said recesses, and an outer ring or hoop formed with inner corrugations corresponding in shape to the shape of the grooves in said internal member, forced in its turn upon said tube.

In testimony whereof I have signed my name to this specification.

ROGER SAVON.